(12) United States Patent
Ichinohe

(10) Patent No.: US 9,470,390 B2
(45) Date of Patent: Oct. 18, 2016

(54) VEHICULAR LAMP

(71) Applicant: KOITO MANUFACTURING CO., LTD., Tokyo (JP)

(72) Inventor: Fumitaka Ichinohe, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 49 days.

(21) Appl. No.: 14/662,654

(22) Filed: Mar. 19, 2015

(65) Prior Publication Data

US 2015/0267890 A1 Sep. 24, 2015

(30) Foreign Application Priority Data

Mar. 24, 2014 (JP) ................... 2014-059584

(51) Int. Cl.
*F21S 8/10* (2006.01)
*F21V 8/00* (2006.01)

(52) U.S. Cl.
CPC .......... *F21S 48/2243* (2013.01); *F21S 48/215* (2013.01); *F21S 48/225* (2013.01); *F21S 48/2212* (2013.01); *F21S 48/2268* (2013.01); *F21S 48/2287* (2013.01); *F21S 48/25* (2013.01); *G02B 6/0046* (2013.01)

(58) Field of Classification Search
CPC ...... F21S 48/25; F21S 48/215; F21S 48/225; F21S 48/2212; F21S 48/2243; F21S 48/2268; F21S 48/2287; G02B 6/0046
See application file for complete search history.

(56) References Cited

U.S. PATENT DOCUMENTS

| 7,290,906 B2 * | 11/2007 | Suzuki | B60Q 1/2696 362/328 |
| 8,702,281 B2 * | 4/2014 | Okada | F21S 48/215 362/307 |
| 2003/0086276 A1 | 5/2003 | Ohtsuka et al. | |

FOREIGN PATENT DOCUMENTS

JP 3984023 B2 9/2007

* cited by examiner

*Primary Examiner* — Stephen F Husar
(74) *Attorney, Agent, or Firm* — Sughrue Mion, PLLC

(57) ABSTRACT

A vehicular lamp includes a light source; and a light guide including a sub-light guiding part and a main light guiding part that are arranged adjacent to each other in a first direction. The sub-light guiding part extends in a second direction. The sub-light guiding part is configured such that light entering the sub-light guiding part from the light source is guided in the second direction and is emitted to the main light guiding part. The main light guiding part extends in a lamp front-rear direction and the second direction. The main light guiding part is configured such that the light that is emitted by the light source and enters the main light guiding part through the sub-light guiding part is internally reflected at a rear end face of the main light guiding part, and is emitted forward through a front end face of the main light guiding part.

6 Claims, 5 Drawing Sheets

VEHICULAR LAMP

INCORPORATION BY REFERENCE

The disclosure of Japanese Patent Application No. 2014-059584 filed on Mar. 24, 2014 including the specification, drawings and abstract is incorporated herein by reference in its entirety.

BACKGROUND OF THE INVENTION

1. Field of the Invention

The present invention relates to a vehicular lamp including a light guide.

2. Description of Related Art

A vehicular lamp that includes a light source and a light guide that guides light emitted by the light source and emits the light forward is conventionally known.

Japanese Patent No. 3984023 describes a vehicular lamp including a light guide in the form of a plate, which extends along a horizontal plane and is configured such that light emitted by a plurality of light-emitting diodes enter the light guide through a rear end face thereof, and the light is emitted through a front end face thereof.

By employing the configuration described in Japanese Patent No. 3984023, it is possible to emit light through the front end face of the light guide.

However, since the light from light-emitting diodes is so directional that a phenomenon called dot lighting is likely to be caused in the configuration described in Japanese Patent No. 3984023. The phenomenon called dot lighting is a phenomenon in which light in the form of dots is emitted from a plurality of spots in the front end face of the light guide. This makes it difficult to uniformly emit light from the light guide.

SUMMARY OF THE INVENTION

The present invention provides a vehicular lamp including a light guide from which light is uniformly emitted.

An aspect of the present invention relates to a vehicular lamp including a light source; and a light guide that guides light emitted by the light source and emits the light forward. The light guide includes a sub-light guiding part and a main light guiding part that are arranged adjacent to each other in a first direction that intersects with a lamp front-rear direction. The sub-light guiding part extends in a second direction that intersects with both of the lamp front-rear direction and the first direction. The sub-light guiding part is configured such that the light that enters the sub-light guiding part from the light source is guided in the second direction and is emitted to the main light guiding part. The main light guiding part extends in the lamp front-rear direction and the second direction. The main light guiding part is configured such that the light that is emitted by the light source and enters the main light guiding part through the sub-light guiding part is internally reflected at a rear end face of the main light guiding part, and is emitted forward through a front end face of the main light guiding part.

The kind of the "light source" is not particularly limited. For example, a light-emitting element, such as a light-emitting diode or a laser diode, or a light source bulb may be employed.

The "lamp front-rear direction" refers to a direction that connects the lamp and a position in which the lighting state of the lamp can be observed from the outside, and its specific direction is not particularly limited.

The specific direction of the "first direction" is not particularly limited as long as the "first direction" is a direction that intersects with the lamp front-rear direction.

The specific shape, such as the length or cross-sectional shape, of the "sub-light guiding part" is not particularly limited as long as the "sub-light guiding part" extends in the second direction and is configured such that the light that enters the sub-light guiding part from the light source is guided in the second direction and is emitted to the main light guiding part.

The specific shape of the "main light guiding part" is not particularly limited as long as the "main light guiding part" extends in the lamp front-rear direction and the second direction.

As described in the above configuration, the vehicular lamp according to the present invention includes the light guide that includes the sub-light guiding part and the main light guiding part that are arranged adjacent to each other in the first direction that intersects with the lamp front-rear direction, and the sub-light guiding part is configured such that the light emitted by the light source enters the sub-light guiding part, and the light is guided in the second direction and is emitted to the main light guiding part. Thus, the light that enters the main light guiding part can be made uniform to some extent.

The main light guiding part extends in the lamp front-rear direction and the second direction, and is configured such that the light that enters the main light guiding part from the sub-light guiding part is internally reflected at the rear end face of the main light guiding part and is emitted forward through the front end face of the main light guiding part. Thus, the light that is emitted through the front end face of the main light guiding part can be made further uniform.

According to the above-described aspect of the present invention, it is possible to provide the vehicular lamp including the light guide from which light is uniformly emitted.

In the above-described aspect, the sub-light guiding part may be configured such that the light emitted by the light source enters the sub-light guiding part through an end face of the sub-light guiding part in the second direction; and the main light guiding part may be disposed in a position away from the end face of the sub-light guiding part in the second direction. With this configuration, the light from the sub-light guiding part enters the entire area of the main light guiding part in the second direction. Thus, the light emitted through the front end face of the main light guiding part can be made more uniform.

In the above-described aspect, a width of the main light guiding part in the first direction may be smaller than a width of the sub-light guiding part in the first direction. With this configuration, the main light guiding part emits a bright narrow beam of light.

In the above-described aspect, the sub-light guiding part may be provided with a fitting leg portion that is used to fix the light guide. With this configuration, it is possible to fix the light guide without affecting the light distribution control function of the main light guiding part.

In the above-described aspect, a shield member that shields a front face of the sub-light guiding part may be provided in front of the sub-light guiding part. With this configuration, it is possible to improve the appearance of the lamp without affecting the light distribution control function of the main light guiding part.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the present invention will be described with reference to the drawings.

Figure 1:
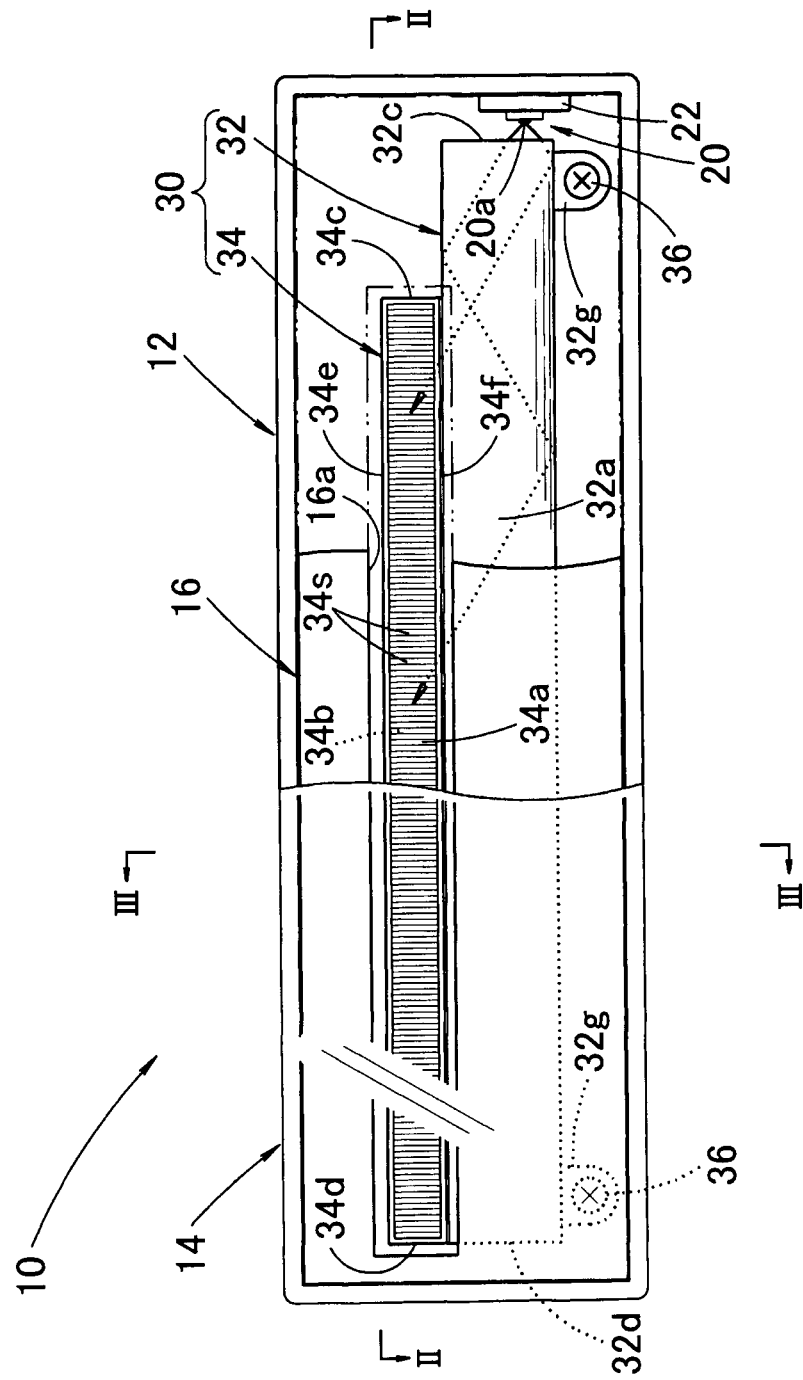
FIG. 1 is a front view that illustrates a vehicular lamp according to an embodiment of the present invention.
Figure 2:
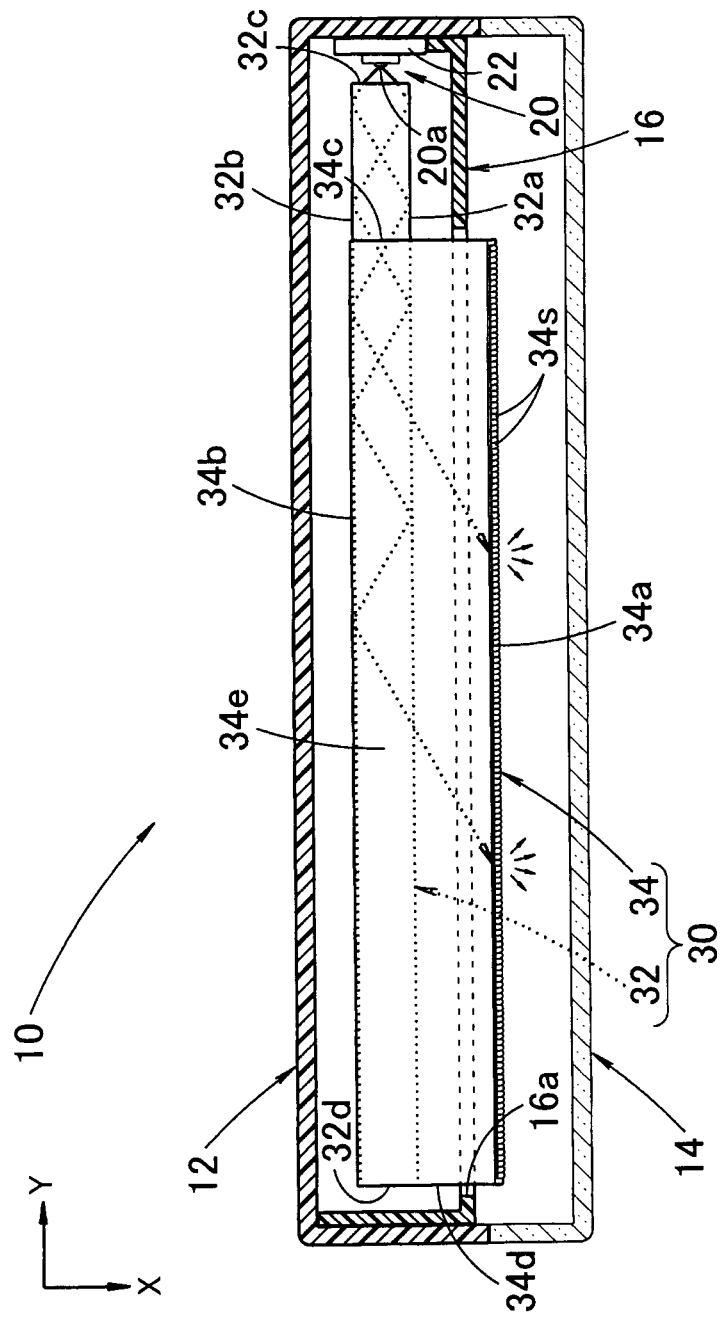
FIG. 2 is a sectional view taken along the line II-II in FIG. 1.
Figure 3:
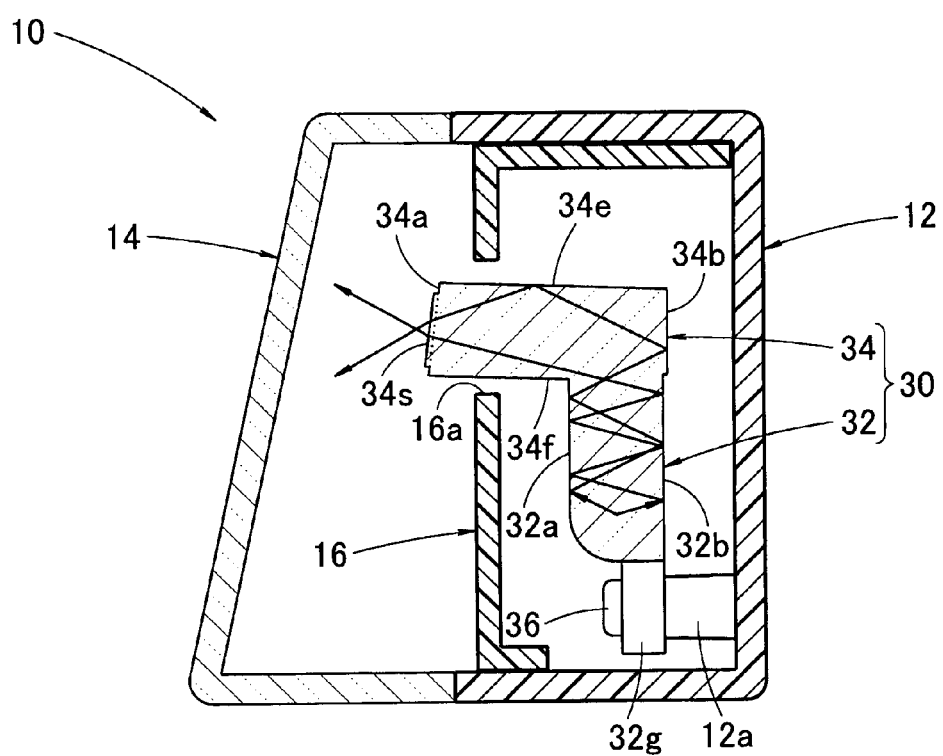
FIG. 3 is a cross-sectional view taken along the line III-III in FIG. 1.

FIG. 1 is a front view that illustrates a vehicular lamp 10 according to an embodiment of the present invention. FIG. 2 is a sectional view taken along the line II-II in FIG. 1, and FIG. 3 is a sectional view taken along the line III-III in FIG. 1.

As shown in these drawings, the vehicular lamp 10 according to the embodiment is a tail lamp that is provided at a rear end portion of a vehicle. The vehicular lamp 10 has a configuration in which a light source 20 and a light guide 30 that guides light emitted by the light source 20 and emits the light forward are provided in a lamp chamber that is defined by a lamp body 12 with a front end opening and a plain translucent cover 14 that is attached to the front end opening of the lamp body 12.

The direction that is indicated by X in FIG. 2 represents the "forward direction" with respect to the vehicular lamp 10 (the "rearward direction" with respect to the vehicle), and the direction that is indicated by Y represents the "rightward direction" that is orthogonal to the "forward direction."

The light guide 30 includes a sub-light guiding part 32 and a main light guiding part 34 that are arranged adjacent to each other in an up-down direction.

The sub-light guiding part 32 has a vertically elongated vertical cross-sectional shape and extends in a vehicle width direction. An upper end portion of the sub-light guiding part 32 is connected to the main light guiding part 34. The main light guiding part 34 is in the form of a plate, and extends along a horizontal plane. A rear portion of the main light guiding part 34 is connected to the sub-light guiding part 32. In this case, a width of the main light guiding part 34 in the up-down direction is smaller than a width of the sub-light guiding part 32 in the up-down direction.

The light source 20, which is a red light-emitting diode, is located in the vicinity of the right lower region of a right end face 32c of the sub-light guiding part 32 with its light-emitting face 20a oriented toward the right end face 32c. The light source 20 is supported by the lamp body 12 via a substrate 22.

The sub-light guiding part 32 is configured such that light from the light source 20 enters the sub-light guiding part 32 through a lower region of the right end face 32c and the light is guided leftward in the inside of the sub-light guiding part 32 and is emitted to the main light guiding part 34.

A rear face 32b of the sub-light guiding part 32 extends along a vertical plane over the entire height thereof. A front face 32a of the sub-light guiding part 32 extends along a vertical plane and a lower end portion of the front face 32a has an arc cross-sectional shape.

The sub-light guiding part 32 is provided with paired right and left fitting leg portions 32g that are used to fix the light guide 30 to the lamp body 12. The paired right and left fitting leg portions 32g respectively protrude downward from the right and left end portions of a lower end face of the sub-light guiding part 32, and are respectively fixed firmly by screws 36 to paired right and left boss portions 12a formed on the lamp body 12.

The main light guiding part 34 is configured such that the light that is emitted by the light source 20 and enters the main light guiding part 34 through the sub-light guiding part 32 is internally reflected due to total reflection at the rear end face 34b of the main light guiding part 34 and the light is emitted forward through the front end face 34a of the main light guiding part 34. At this time, in the main light guiding part 34, the light that is internally reflected at the rear end face 34b reaches the front end face 34a directly, or the light that is internally reflected at the rear end face 34b is internally reflected due to total reflection at the upper face 34e (and a lower face 34f) of the main light guiding part 34 to reach the front end face 34a.

The front end face 34a of the main light guiding part 34 has a laterally elongated rectangular outer shape. A plurality of diffusing lens elements 34s is formed continuously in a right-left direction in the front end face 34a. Each of the diffusing lens elements 34s is formed as a convex cylindrical lens element that extends in the up-down direction, and thus, the light that reaches the front end face 34a is widely diffused in the right-left direction.

The main light guiding part 34 is located in a position away from the right end face 32c of the sub-light guiding part 32. In other words, the main light guiding part 34 has a right end face 34c that is offset to the left from the right end face 32c of the sub-light guiding part 32 by an offset amount that is greater than the width of the right end face 32c of the sub-light guiding part 32 in the up-down direction.

A left end face 34d of the sub-light guiding part 32 and a left end face 34d of the main light guiding part 34 are set (disposed) at the same position.

A shield member 16 that shields (hides) the front face 32a of the sub-light guiding part 32 is disposed in the lamp chamber. The shield member 16 is disposed at a position that is in front of the front face 32a of the sub-light guiding part 32 and that is behind the front end face 34a of the main light guiding part 34. The shield member 16 is in the form of a plate, and extends along a vertical plane orthogonal to the lamp front-rear direction.

The shield member 16 has a laterally elongated rectangular opening 16a that is slightly larger than the front end face 34a of the main light guiding part 34, and a front end portion of the main light guiding part 34 protrudes forward through the opening 16a.

An outer periphery of the shield member 16 is fixed to the lamp body 12.

Next, the effects of this embodiment will be described.

The vehicular lamp 10 according to the embodiment includes the light guide 30 that includes the sub-light guiding part 32 and the main light guiding part 34 that are arranged adjacent to each other in the up-down direction (in other words, a first direction that intersects with the lamp front-rear direction). The sub-light guiding part 32 is configured such that the light emitted by the light source 20 enters the sub-light guiding part 32, and the light is guided in the vehicle width direction (in other words, a second direction that intersects with both of the lamp front-rear direction and the first direction) and is emitted to the main light guiding part 34. Thus, the light that enters the main light guiding part 34 can be made uniform to some extent.

The main light guiding part 34 extends along the horizontal plane (in other words, the main light guiding part 34 extends in the lamp front-rear direction and the second direction), and is configured such that the light that enters the main light guiding part 34 from the sub-light guiding part 32 is internally reflected at the rear end face 34*b* and is emitted forward through the front end face 34*a*. Thus, the light that is emitted through the front end face 34*a* of the main light guiding part 34 can be made further uniform.

Thus, according to the embodiment, it is possible to provide the vehicular lamp 10 including the light guide 30 from which light is uniformly emitted.

In the embodiment, the sub-light guiding part 32 is configured to receive light from the light source 20 through the right end face 32*c* thereof (in other words, the end face in the second direction) and the main light guiding part 34 is located in the position away from the right end face 32*c* of the sub-light guiding part 32. Therefore, the light from the sub-light guiding part 32 enters the entire area of the main light guiding part 34 in the vehicle width direction. Thus, the light emitted through the front end face 34*a* of the main light guiding part 34 is made more uniform.

Further, in the embodiment, a width of the main light guiding part 34 in the up-down direction is smaller than a width of the sub-light guiding part 32 in the up-down direction. Thus, the main light guiding part 34 emits a bright narrow beam of light.

Further, in the embodiment, the paired right and left fitting leg portions 32*g* that are used to fix the light guide 30 are respectively provided at the right and left end portions of the lower end face of the sub-light guiding part 32. Thus, it is possible to fix the light guide 30 without affecting the light distribution control function of the main light guiding part 34.

Further, in the embodiment, the shield member 16 that shields the front face 32*a* of the sub-light guiding part 32 is disposed in front of the sub-light guiding part 32. Thus, it is possible to improve the appearance of the lamp without affecting the light distribution control function of the main light guiding part 34. In addition, the shield member 16 has the laterally elongated rectangular opening 16*a* that is slightly larger than the front end face 34*a* of the main light guiding part 34 that has the laterally elongated rectangular outer shape. Thus, it is possible to further improve the appearance of the lamp.

In the embodiment, the sub-light guiding part 32 has the vertically elongated vertical cross-sectional shape. However, the sub-light guiding part 32 may have a cross-sectional shape other than the vertically elongated vertical cross-sectional shape (for example, the sub-light guiding part 32 may have an arc cross-sectional shape close to a circular cross-sectional shape).

In the embodiment, the plurality of diffusing lens elements 34*s* is formed on the front end face 34*a* of the main light guiding part 34. However, the front end face 34*a* may be formed as a light diffusing surface by, for example, grain finish or frost treatment.

In the embodiment, a light-emitting diode is used as the light source 20. However, a kind of light source other than the light-emitting diode may be used.

In the embodiment, the sub-light guiding part 32 receives light from the light source 20 through the right end face 32*c*. However, the sub-light guiding part 32 may receive light through the left end face 32*d* or through both of the right end face 32*c* and the left end face 32*d*.

In the embodiment, the case where the vehicular lamp 10 is a tail lamp is described. However, the same effects as those of the embodiment can be obtained by employing the same configuration as that of the embodiment, regardless of the location in which the vehicular lamp is installed in the vehicle and the function of the vehicular lamp.

Next, modified examples of the embodiment will be described.

A first modified example of the embodiment will be described.

Figure 4:
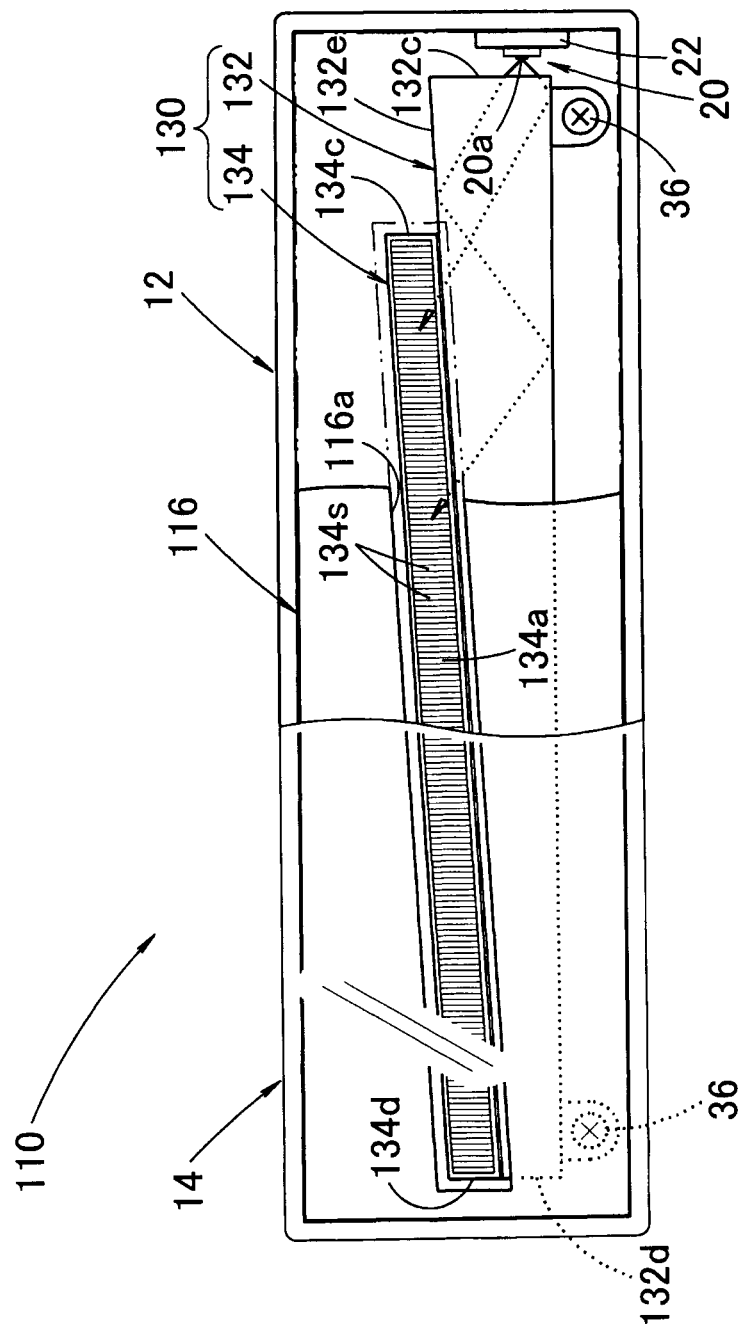
FIG. 4 is a view similar to FIG. 1, which shows a first modified example of the embodiment.

FIG. 4 is a view similar to FIG. 1, which shows a vehicular lamp 110 according to the modified example.

As shown in the drawing, the vehicular lamp 110 according to the modified example has the same basic configuration as that of the vehicular lamp 10 according to the embodiment. However, the vehicular lamp 110 according to the modified example is different from the vehicular lamp 10 according to the embodiment in the configuration of a light guide 130 and a shield member 116.

In the light guide 130 in the modified example, an upper end portion of a sub-light guiding part 132 is connected to a rear portion of a main light guiding part 134.

However, the sub-light guiding part 132 has an upper end face 132*e* that is inclined obliquely downward from a right end face 132*c* thereof to a left end face 132*d* thereof. The width of the sub-light guiding part 132 in the up-down direction is gradually decreased from the right end face 132*c* to the left end face 132*d*.

On the other hand, the width of the main light guiding part 134 in the up-down direction is constant from a right end face 134*c* thereof to a left end face 134*d* thereof. In other words, the outer shape of a front end face 134*a* of the main light guiding part 134 is a laterally elongated parallelogram. On the front end face 134*a*, a plurality of diffusing lens elements 134*s* is formed as convex cylindrical lens elements that extend in the up-down direction.

In the modified example as well, the main light guiding part 134 is disposed in a position away from the right end face 132*c* of the sub-light guiding part 132, and the width of the main light guiding part 134 in the up-down direction is smaller than the width of the sub-light guiding part 132 in the up-down direction at any position in the vehicle width direction.

The shield member 116 in the modified example has an opening 116*a* that has the shape of a laterally elongated parallelogram, and that is slightly larger than the front end face 134*a* of the main light guiding part 134.

When the configuration in the modified example is employed, the same effects as those of the embodiment can be obtained.

In the modified example, because the width of the sub-light guiding part 132 in the up-down direction is gradually decreased from the right end face 132*c* to the left end face 132*d*, the following effect can be obtained.

If the width of the sub-light guiding part 132 in the up-down direction were constant, the amount of light that enters the main light guiding part 134 from the sub-light guiding part 132 would likely to decrease at positions remote from the right end face 132*c*. However, since the width of the sub-light guiding part 132 in the up-down direction is gradually decreased from the right end face 132*c* to the left end face 132*d* in the modified example, the amount of light that enters the main light guiding part 134 from the sub-light guiding part 132 can be made more uniform at positions in the vehicle width direction.

Next, a second modified example of the embodiment will be described.

Figure 5:
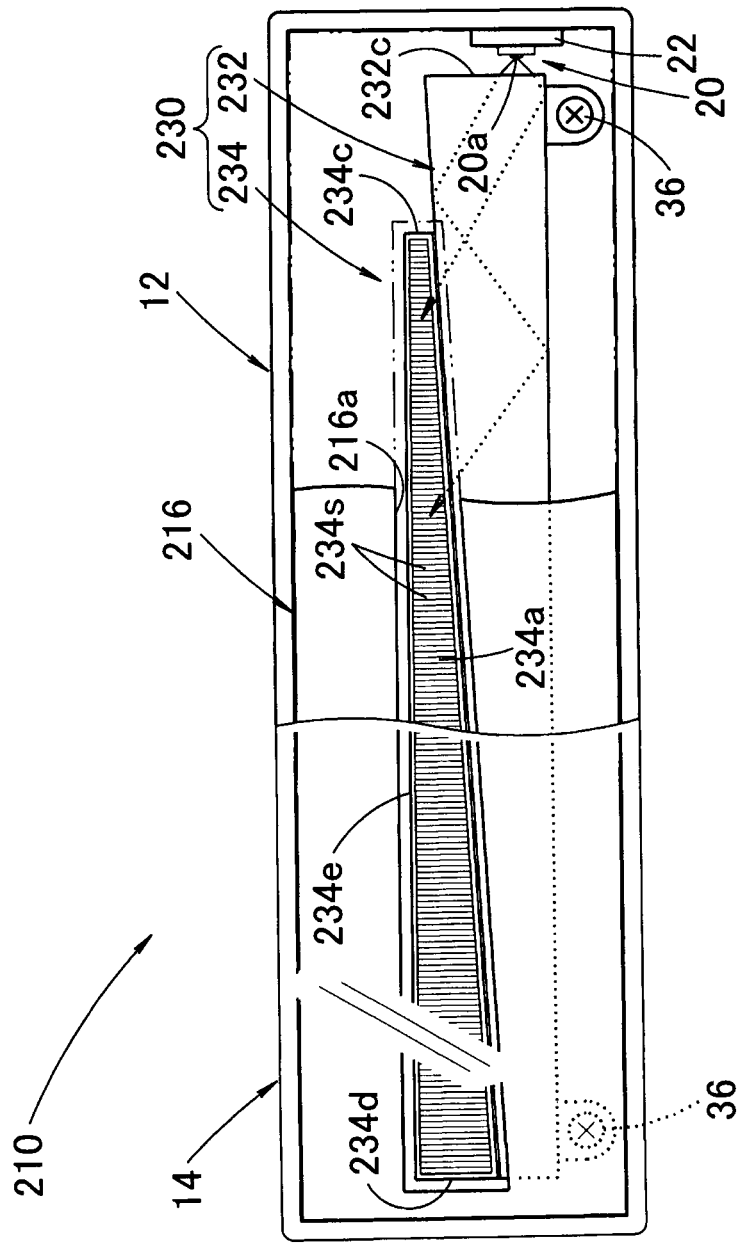
FIG. 5 is a view similar to FIG. 1, which shows a second modified example of the embodiment.

FIG. 5 is a view similar to FIG. 1, which shows a vehicular lamp 210 according to the second modified example.

As shown in the drawing, the vehicular lamp 210 according to the second modified example has the same basic configuration as that of the vehicular lamp 110 according to the first modified example. However, the vehicular lamp 210 according to the second modified example is different from the vehicular lamp 110 according to the first modified example in the configuration of a main light guiding part 234 of a light guide 230 and a shield member 216.

In the light guide 230 according to the second modified example, an upper end portion of a sub-light guiding part 232, which is similar to the sub-light guiding part 132 in the first modified example, is connected to a rear portion of the main light guiding part 234, and the main light guiding part 234 is disposed in a position away from a right end face 232c of the sub-light guiding part 232.

However, the main light guiding part 234 has an upper face 234e that extends horizontally from a right end face 234c thereof to a left end face 234d thereof, and the width of the main light guiding part 234 in the up-down direction is gradually increased from the right end face 234c to the left end face 234d.

Thus, a front end face 234a of the main light guiding part 234 has an outer shape of a laterally elongated trapezoid. On the front end face 234a, a plurality of diffusing lens elements 234s is formed as convex cylindrical lens elements that extend in the up-down direction.

The shield member 216 according to the modified example has an opening 216a that has the shape of a laterally elongated trapezoid, and that is slightly larger than the front end face 234a of the main light guiding part 234.

When the configuration in the modified example is employed, the same effects as those of the embodiment can be obtained.

When the configuration in the modified example is employed, the front end face 234a of the light guide 230 has the outer shape of a laterally elongated trapezoid. Thus, it is possible to provide the light-emitting face with a characteristic shape.

The numerical values described as specifications in the embodiment and the modified examples thereof are examples of the values, and therefore, the values may naturally be set to different values as appropriate.

The present invention is not limited to the configurations that are described in the embodiment and the modified examples thereof, and it is possible to employ configurations obtained by making various changes and modifications to the configurations in the embodiment and the modified examples.

What is claimed is:

1. A vehicular lamp comprising:
a light source; and
a light guide that guides light emitted by the light source and emits the light forward, wherein:
the light guide includes a sub-light guiding part and a main light guiding part that are arranged adjacent to each other in a first direction that intersects with a lamp front-rear direction;
the sub-light guiding part extends in a second direction that intersects with both of the lamp front-rear direction and the first direction;
the sub-light guiding part is configured such that the light that enters the sub-light guiding part from the light source is guided in the second direction and is emitted to the main light guiding part;
the main light guiding part extends in the lamp front-rear direction and the second direction; and
the main light guiding part is configured such that the light that is emitted by the light source and enters the main light guiding part through the sub-light guiding part is internally reflected at a rear end face of the main light guiding part, and is emitted forward through a front end face of the main light guiding part.

2. The vehicular lamp according to claim 1, wherein:
the sub-light guiding part is configured such that the light emitted by the light source enters the sub-light guiding part through an end face of the sub-light guiding part in the second direction; and
the main light guiding part is disposed in a position away from the end face of the sub-light guiding part in the second direction.

3. The vehicular lamp according to claim 1, wherein a width of the main light guiding part in the first direction is smaller than a width of the sub-light guiding part in the first direction.

4. The vehicular lamp according to claim 1, wherein the sub-light guiding part is provided with a fitting leg portion that is used to fix the light guide.

5. The vehicular lamp according to claim 1, wherein a shield member that shields a front face of the sub-light guiding part is provided in front of the sub-light guiding part.

6. The vehicular lamp according to claim 1, wherein:
the sub-light guiding part is configured such that the light emitted by the light source enters the sub-light guiding part through an end face of the sub-light guiding part in the second direction;
the main light guiding part is disposed in a position away from the end face of the sub-light guiding part in the second direction;
a width of the sub-light guiding part in the first direction is decreased from the end face of the sub-light guiding part in the second direction to another end face of the sub-light guiding part in the second direction.

* * * * *